United States Patent [19]

Provost et al.

[11] Patent Number: 5,606,781
[45] Date of Patent: Mar. 4, 1997

[54] SEPARABLE FASTENER HAVING A BALD PERIMETER RIB BOUNDED BY FASTENING ELEMENTS

[75] Inventors: George A. Provost, Litchfield, N.H.; Brian J. Routhier, Leesburg, Va.; Martin I. Jacobs, Bedford, N.H.

[73] Assignee: Velcro Industries, B.V., Curaco, Netherlands Antilles

[21] Appl. No.: 391,695

[22] Filed: Feb. 17, 1995

[51] Int. Cl.$^6$ .................................................. A44B 18/00
[52] U.S. Cl. ................................. 24/452; 24/306; 24/450
[58] Field of Search ............................. 24/452, 444, 442, 24/306, 446, 450, 451, 447, 448; 128/DIG. 15; 2/912

[56] References Cited

U.S. PATENT DOCUMENTS

| | | | |
|---|---|---|---|
| 2,499,898 | 3/1950 | Anderson | 128/DIG. 15 |
| 3,066,321 | 12/1962 | Kintner | 24/450 |
| 3,248,758 | 5/1966 | Schmitz et al. | 18/42 |
| 4,012,544 | 3/1977 | Richards | 428/95 |
| 4,470,857 | 9/1984 | Casalou | 156/66 |
| 4,491,556 | 1/1985 | Fujii et al. | 264/243 |
| 4,531,733 | 7/1985 | Hall | 24/452 |
| 4,563,380 | 1/1986 | Black et al. | 428/100 |
| 4,592,118 | 6/1986 | DeWoskin | 24/444 |
| 4,617,214 | 6/1995 | Billarant | 428/40 |
| 4,673,542 | 6/1987 | Wigner et al. | 264/46.7 |
| 4,693,921 | 9/1987 | Billarant et al. | 428/100 |
| 4,710,414 | 12/1987 | Northrup et al. | 428/43 |
| 4,726,975 | 2/1988 | Hatch | 428/100 |
| 4,784,890 | 11/1988 | Black | 428/100 |
| 4,792,111 | 12/1988 | Taguchi | 249/83 |
| 4,802,939 | 2/1989 | Billarant et al. | 156/155 |
| 4,814,036 | 3/1989 | Hatch | 156/245 |
| 4,842,916 | 6/1989 | Ogawa et al. | 428/100 |
| 4,881,997 | 11/1989 | Hatch | 156/66 |

(List continued on next page.)

FOREIGN PATENT DOCUMENTS

| | | |
|---|---|---|
| 0138724A2 | 4/1985 | European Pat. Off. . |
| 0210536A1 | 2/1987 | European Pat. Off. . |
| 2405123 | 5/1979 | France . |
| 2423666 | 11/1979 | France . |
| 2463870 | 2/1981 | France . |
| 2609758 | 7/1988 | France . |
| 59-133029 | 7/1984 | Japan . |
| 0972648 | 10/1964 | United Kingdom ...................... 24/446 |
| 1161406 | 8/1969 | United Kingdom ...................... 24/306 |
| WO86/03164 | 6/1986 | WIPO . |
| 8606641 | 11/1986 | WIPO ............................ 128/DIG. 15 |

*Primary Examiner*—Victor N. Sakran
*Attorney, Agent, or Firm*—Steven J. Weissburg

[57] ABSTRACT

A separable fastener component for use with a complementary separable fastener component has a base member, having a nominal fastening face and a non-fastening face. Carried on the fastening face is a pattern of fastening elements, comprising a main region carrying fastening elements. Substantially surrounding the main region is a bald region that is substantially free of fastening elements; and substantially surrounding the bald region, is a perimeter region that carries fastening elements. The bald region may be a rectangular annulus, as may be the perimeter region of fastening elements. The bald and perimeter regions may also be non-rectangular. The sacrificial perimeter fastening elements may be hooks or loops. Anchoring elements may be provided on the non-fastening face of the base. Rather than the bald region being one that surrounds the main region, it may bound a portion of the main region and may be a pair of bald regions that are substantially free of fastening elements. Adjoining each of the bald regions is a bounding region that carries hook-type fastening elements, arranged such that each bald region is sandwiched between said main region and a respective bounding region.

The fastening component may be incorporated into a molded product, with minimal intrusion of the molding material into the fastening elements of the main region.

A method of making the fastening component and molded article, as well as a mold are also disclosed.

14 Claims, 5 Drawing Sheets

U.S. PATENT DOCUMENTS

| | | | |
|---|---|---|---|
| 4,931,344 | 6/1990 | Ogawa et al. | 428/100 |
| 4,933,035 | 6/1990 | Billarant et al. | 156/155 |
| 5,000,903 | 3/1991 | Matzinger et al. | 264/511 |
| 5,034,998 | 7/1991 | Kolsky | 2/912 |
| 5,061,540 | 10/1991 | Cripps et al. | 428/100 |
| 5,073,318 | 12/1991 | Rohrlach et al. | 264/46.5 |
| 5,110,649 | 5/1992 | Morse et al. | 428/100 |
| 5,171,395 | 12/1992 | Gilcreast | 156/500 |
| 5,180,618 | 1/1993 | Kessler et al. | 428/100 |
| 5,205,892 | 4/1993 | Gagliani et al. | 156/212 |
| 5,247,764 | 9/1993 | Jeshurun et al. | 49/495.1 |
| 5,259,905 | 11/1993 | Gilcreast | 156/250 |
| 5,260,015 | 11/1993 | Kennedy et al. | 264/167 |
| 5,286,431 | 2/1994 | Banfield et al. | 264/134 |
| 5,422,156 | 6/1995 | Billarant et al. | 428/100 |

SEPARABLE FASTENER HAVING A BALD PERIMETER RIB BOUNDED BY FASTENING ELEMENTS

BACKGROUND

The invention relates to the field of separable hook and loop-type fasteners that can be attached to synthetic resin molded articles. It relates more specifically to a fastener component that minimizes the fouling of the fastener elements with material to be molded, along with products incorporating such a fastener component, and methods of use thereof.

Hook and loop-type fasteners are in wide use for joining textile fabrics and various other items. For instance, it is known to attach one component of a loop and hook fastener to the surface of a foam cushion body and to attach the other component to a corresponding position on the back side of a cover material, fixing the latter on the cushion body by engagement of the two fastener components. In this method, one fastener component (typically the hook component) is attached to the cushion body surface by one of two methods. It is important to prevent the molding material from being forced into that region of the mold where the fastener component is held. Otherwise, it will foul the fastener elements (such as the hooks).

According to one known method, a non-woven fabric sheet is attached to the back side of a fastener strip with hook-like coupling elements. The fastener component is set within a mold by the use of an adhesive, and a foamable material is introduced into the mold for foaming the same therein. Alternatively, hook-like coupling elements of a fastener component may be associated with metal, such as a thin metal sheet, and may be fixed in a mold by magnetic attraction. A foamable material is introduced into the mold to fix the fastener component integrally on the molded body. In either case, a protective film may be introduced to seal the fastener components from the molding material.

Using an adhesive is often troublesome in addition to the difficulty in adjusting the fastener mounting position. On the other hand, covering the whole surface area of the hook-like coupling elements with a protective film prevents intrusion of the molding material into spaces between the individual coupling elements during the molding process. However, it involves a laborious job of applying the protective film and then removing it from the hook-like coupling elements after removal of the molded article from the mold. Additionally, the fastening force of the hook-like coupling elements is lowered by existence of unfused film residues in case of a film which is thermally fusible while foaming the molding material.

It is also known to provide a hook and loop-type fastener component to be attached to a plastic molding, which is constituted by: an elongated fastener strip having hook-like coupling elements on the nominal front side of a base; longitudinal edge portions void of the hook-like coupling elements and, provided along the longitudinal side edges of the fastener strip, a barrier member provided on the front side (the side of the hook-like coupling elements) of the longitudinal edge portion. The barrier may be a bunch of fiber or a synthetic resin material in a height not greater than twice the height of the hook-like coupling elements.

A draw-back of this barrier method is that a special, extra step or steps is required to fabricate the marginal barriers and to fix them to the fastener component and to remove them. Further, the molding material can still intrude along the edges that are not provided with the barriers.

Thus, it is an object of the invention to provide a separable fastener component that can prevent intrusion of a molding material into the spaces between the individual coupling elements (typically hook-like elements) without requiring labor intensive steps of applying and removing a protective film, or of fabricating and applying a marginal barrier element. It is a further object to facilitate the manufacture of elements to which such a separable fastener component is attached, such as by molding. Another object is to provide molded articles with integral fastener components, without fouling the fastener elements of the fastener components with molding material.

SUMMARY

One preferred aspect of the invention is a fastener component having a pattern of fastening elements, arranged with a main region that bears fastening elements, surrounded by a bald region that is free of fastening elements. The bald region is itself surrounded by a region of sacrificial fastening elements. The sacrificial fastening elements stop the incursion of molding material into the main region of fastening elements, thereby preserving the fastening elements in the main region for fastening. This result is obtained without the need for a separate protective cover for the fastening elements, such as a film or a polymeric cover.

More specifically, a preferred embodiment of the invention is a separable fastener component for use with a complementary separable fastener component. The component comprises a base member, having a nominal fastening face and a non-fastening face; and carried on said fastening face, a pattern of fastening elements, said pattern comprising a main region carrying fastening elements. Substantially surrounding said main region is a bald region that is substantially free of fastening elements; and substantially surrounding said bald region, a perimeter region that carries fastening elements.

The bald region may be a rectangular annulus, as may be the perimeter region of fastening elements. The bald and perimeter regions may also be non-rectangular. The sacrificial perimeter fastening elements may be hooks or loops. Anchoring elements may be provided on the non-fastening face of the base.

According to another embodiment of the invention, rather than the bald region being one that surrounds the main region, it may bound a portion of the main region and may be a pair of bald regions that are substantially free of fastening elements. Adjoining each of said bald regions is a bounding region that carries hook-type fastening elements, arranged such that each bald region is sandwiched between said main region and a respective bounding region.

The main region may be a rectangle, as may be each of the bald regions.

According to another preferred embodiment, the invention is a molded product comprising a body molded from a molding material, said body having at least one surface and an interior body region. Fixed to said surface of said molded body is a separable fastener component for use with a complementary separable fastener component, said separable fastener component comprising. The fastener component may be according to any of the embodiments discussed above.

According to yet another preferred embodiment, the invention is a separable, two component fastener apparatus, comprising a first fastener component according to any of the embodiments discussed above, and a second separable fastener component comprising a surface carrying fastening elements that are complementary to said first fastening elements of said first component.

Still another embodiment of the invention is a method of making a separable fastener component comprising the steps of providing a separable fastener component having a base portion, with a nominal fastening face and a non-fastening face, said fastening face provided with fastening elements substantially over the entire surface; and removing substantially all of said fastening elements from an annular region surrounding a main region in which said fastening elements remain present, said annular region itself being surrounded by a perimeter region in which said fastening elements remain present.

The removing step may be one that removes fastening elements from a substantially rectangular annulus surrounding the main region; and that step may be conducted by first removing the fastening elements from a pair of spaced apart parallel strips. Next, the fastening elements may be removed from a second pair of spaced apart parallel strips, each perpendicular to each of the first pair of parallel strips.

The removing steps may be conducted by ultrasonic fusion, skiving, or using a rolling tool.

Yet another embodiment of the invention is a method of embedding a fastener into a molded article. The embedding method comprises the steps of providing a fastener component according to any of the embodiments discussed above, having a main region carrying fastening elements, substantially surrounded by a bald region that is substantially free of fastening elements. The bald region is itself substantially surrounded by a perimeter region that carries fastening elements. The method includes the step of placing the fastening element in a mold, a wall of the mold comprising: a main valley region, shaped to accommodate said main region carrying fastening elements; a land, raised relative to said main valley region, shaped and sized and located to mate with said bald region of said fastener component when said main region of said fastener component is mated with said main valley region; and a perimeter valley region, surrounding said raised land, shaped and sized and located to accommodate said perimeter region that carries fastening elements, when said main region of said fastening component is mated with said main valley region. Following this step, molding material is provided to the mold, particularly in the region of the placed separable fastener.

The perimeter valley region can comprise a two-walled valley region, with a wall that substantially surrounds the valley region, which wall is either a main exterior wall of the mold, or a wall that is different from a main exterior wall of the mold.

Another preferred embodiment of the invention is a mold for embedding a separable fastener component into a molded article, said fastener having a base member, having a nominal fastening face and a non-fastening face; and carried on said fastening face, a pattern of fastening elements, said pattern comprising: a main region carrying fastening elements; substantially surrounding said main region, a bald region that is substantially free of fastening elements; and substantially surrounding said bald region, a perimeter region that carries fastening elements. The mold comprises: a main valley region, shaped to accommodate said main region of said fastening component; a land, raised relative to said valley region, shaped and sized and located to mate with said bald region of said fastener component when said main region of said fastener component is mated with said main valley region; and a perimeter valley region, surrounding said raised land, shaped and sized and located to accommodate said perimeter region that carries fastening elements, when said central region is mated with said main valley region.

BRIEF DESCRIPTION OF THE DRAWINGS

These and other features, aspects, and advantages of the present invention will become better understood with regard to the following description, appended claims and accompanying drawings, where:

DETAILED DESCRIPTION

Figure 4A:
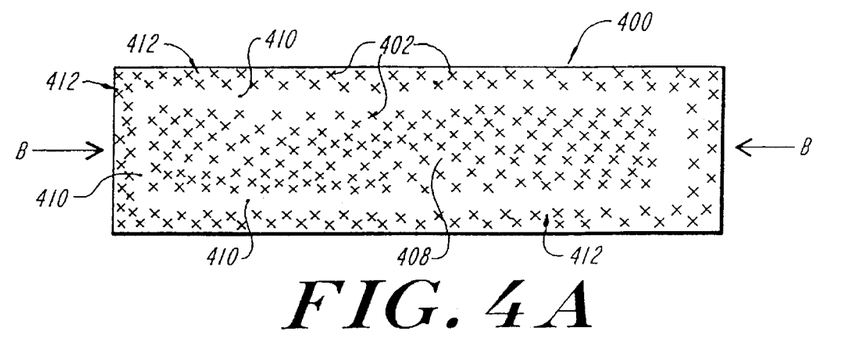
FIG. 4A is a schematic plan representation of a separable fastener component of the invention, having a generally rectangular perimeter bald section and a surrounding perimeter "rib" section of fastener elements.

A preferred embodiment of the invention is shown in FIG. 4A, which is a plan view of a hook-type component 400 of a separable fastener pair of cooperating components. Hook-type coupling elements 402 are carried by the fastener component in a pattern discussed below. The hook-like coupling elements to be provided on the fastening side 404 of the base 406 of the fastener component 500 according to the present invention may be of mushroom, hook, palm tree, or umbrella shape or of any shape as long as they have coupling and uncoupling functions. (All such shapes are hereinafter referred to generally as "hooks" or "hook-like or hook-type coupling elements.") For example, the hook-like coupling elements can be formed by clipping side portions of nylon, polyester, or any other synthetic fiber monofilament loops which are woven into a substrate cloth as subsidiary warps in the weaving process to form upstanding loops on the surface of the substrate cloth. Alternatively, the hooks can be molded integrally with the base 406 using a synthetic resin material, or can be co-extruded with the base using a cross head die. The hook elements on a thin base may be laminated to a different sheet form substrate.

In a preferred embodiment, the hooks are integrally extruded and molded with a base tape 406, and are of a polyamide resin, such as is sold under the tradename Nylon. However, other resins may be used for forming the hooks, such as polyester, polypropylene, PVC, polyolefin, ABS, polyethylene, polystyrene, acetal, acrylic, polycarbonate, polyphenylene oxide, polyurethane, polysulfone and thermoplastic elastomers.

Figure 4B:
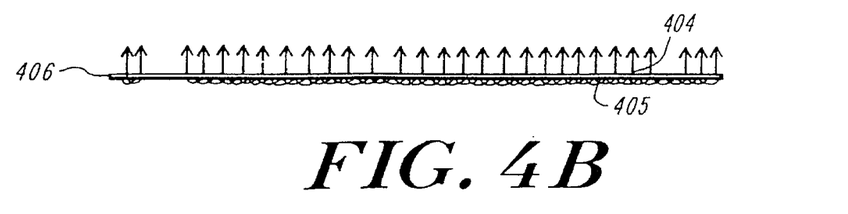
FIG. 4B is schematic representation in elevational cross-section of the fastener component of the invention shown in FIG. 4A, along lines B—B.

The hooks 402 are distributed over the face of the base 406 in a pattern that includes a main filled region 408, bounded by a bald moat 410, which is in turn bounded by a perimeter rib 412 of additional hook elements 402. This arrangement can also be seen in part in the elevational cross-section view of FIG. 4B. The pattern of hook placement within any region, such as within the main filled region 408, is not critical to the invention and may be chosen according to standard design principals.

Figure 1:
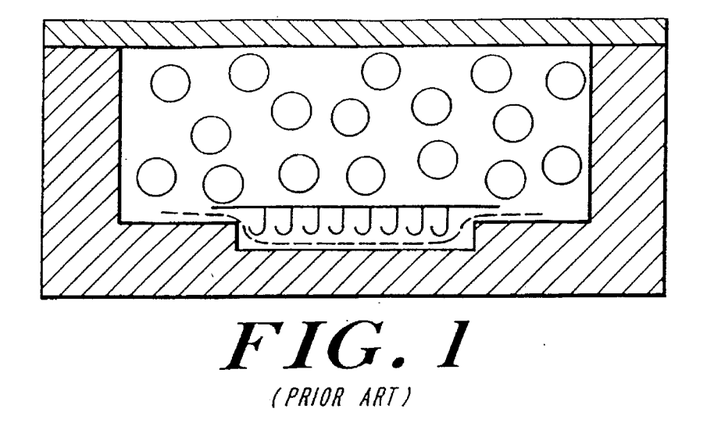
FIG. 1 is a schematic representation, in elevational cross-section, of a prior art separable fastener component being molded into a foam product, showing the mold, fastener component and foam body.
Figure 2:
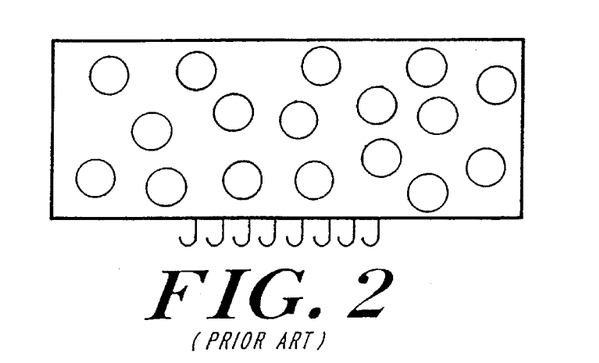
FIG. 2 is a schematic representation, in elevational cross-section, of the prior art separable fastener component of FIG. 1, molded into a foam product, after removal from the mold.
Figures 3, 7:
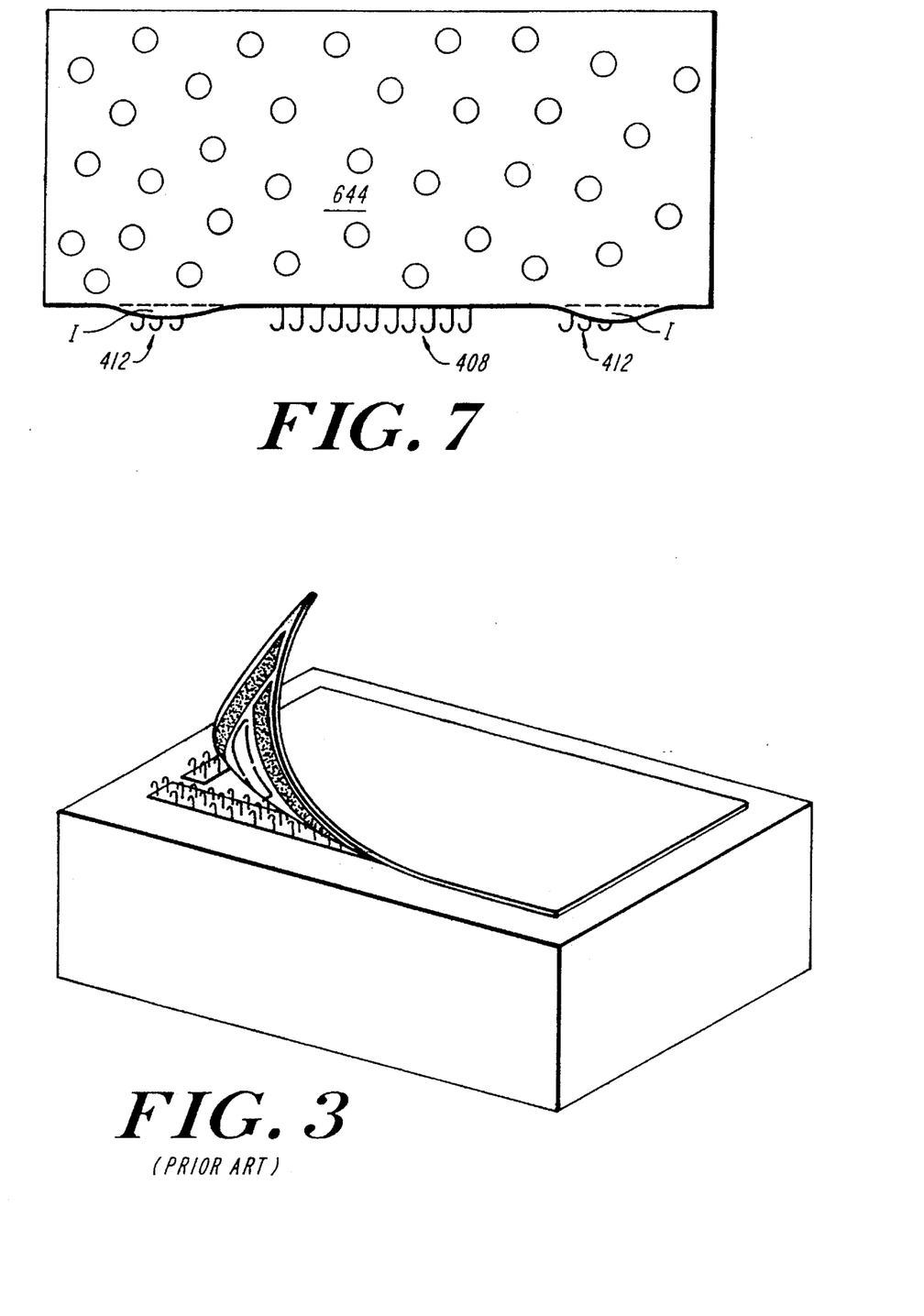
FIG. 3 is a schematic perspective representation of a separable fastener component of the prior art, molded into a foam body, separably fastened to a fabric covering with a cooperating fastener component attached thereto.
FIG. 7 is a schematic representation, in elevational cross-section, of the separable fastener component of the invention shown in FIG. 6, molded into a foam product, after removal from the mold.
Figures 4C, 5:
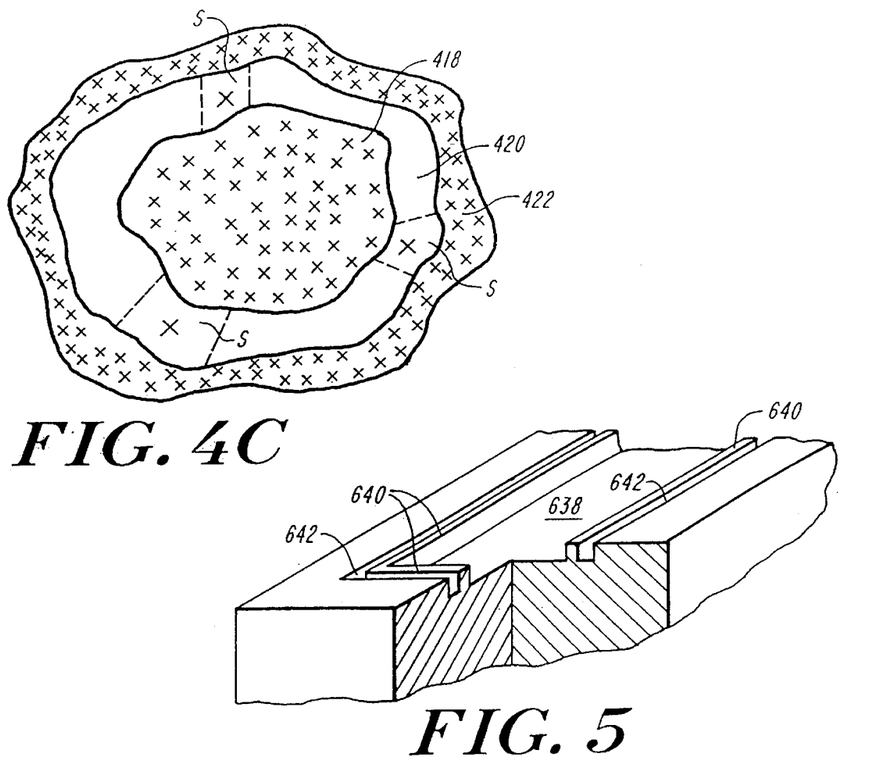
FIG. 4C is a schematic plan representation of another embodiment of a separable fastener component of the invention, having a generally arbitrarily shaped perimeter bald section and a correspondingly shaped perimeter "rib" section of fastener elements.
FIG. 5 is a schematic perspective representation, with some parts removed, of a portion of the bottom of a mold for use with a fastener component of the invention.
Figure 6:
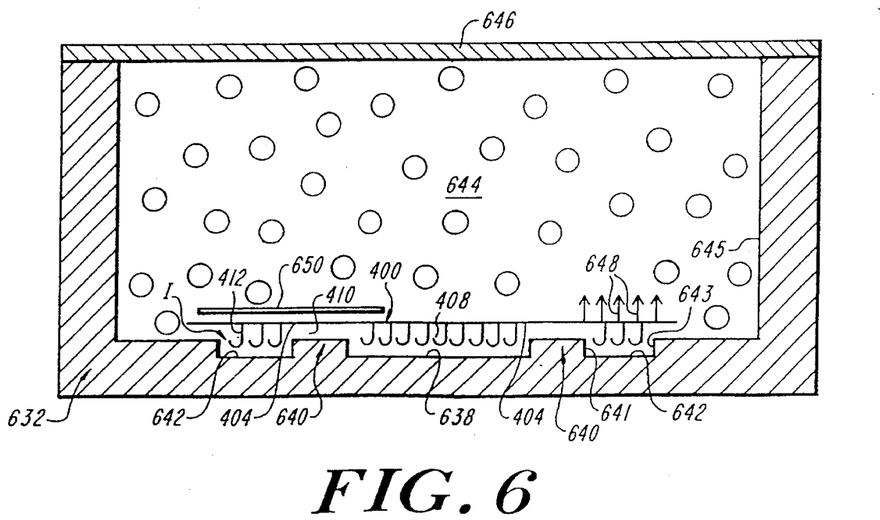
FIG. 6 is a schematic representation, in elevational cross-section, of a separable fastener component of the invention being molded into a foam product, showing the mold, fastener component and foam body.

The cooperation between the fastener component of the invention and a mold suitable for use with the invention is shown with reference to FIGS. 5, 6 and 7. The fastener component 400 is provided in a mold 632. The mold is shaped to accommodate the main filled region 408, bald moat 410 and the perimeter rib 412, having a central valley 638 surrounded by a raised land 640, which is in turn surrounded by a perimeter valley 642 (shown in perspective in FIG. 5, showing the bottom mold wall only, with a corner removed for illustration purposes only).

Molding material 644 fills the mold cavity, and is capped by a cover 646. With reference to FIG. 6, the purpose of the surrounding bald moat 410 and cooperating raised land 640 and the perimeter rib 412 of hooks and cooperating valley 642 will be understood. As the mold material is poured or flowed into the mold, it is typically liquid and may tend to infiltrate between the mold body 632 and the fastening face 404 of the fastener component 400, intruding from the edges of the fastener component 400. As the foam infiltrates, for example, following the path indicated by the curved path I, it meets the perimeter rib 412 of hooks, and is partially impeded from further progress inward toward the main center region 408 by the hooks. (For this reason, these perimeter hooks may be referred to as "sacrificial hooks.") This inward progress is additionally inhibited by the raised land 640 mating with the bald moat 410. The arrangement shown tends to slow down the inward progress of the mold material. During this time period, the molding material is also being foamed and is solidifying. As it solidifies, it tends to flow even slower. Thus, the effect of the sacrificial hooks 412 slowing down the initial progress of the molding material is ultimately to limit its total inward progress.

Because, in a preferred embodiment, the bald moat and perimeter rib of hooks completely surrounds the main center region 408, the molding material cannot intrude into that center region from any approach.

A molded product of the invention, incorporating the fastener component of the invention, is shown in cross-section in FIG. 7. The hooks in the main, central region 408 are free of fouling from the molding material. However, the sacrificial hooks in the perimeter hook rib 412 are typically fouled to some extent, due to the molding material that infiltrated into that region. At that region "I", the surface of the molded article is slightly irregular, or, alternatively, the fastener component will be drawn inward toward the main body of the molded object, leaving a shorter extent of hook exposed beyond the molding material. This engagement of the fastener component by the foam helps to secure the fastener component to the foam article when a force is applied that would otherwise tend to separate the two, such as the separation of a mating, separable fastener component.

A major advantage of the present invention is that after the molding process and subsequent curing, the molded object can be removed, and it is ready for use. It is not necessary to remove any protective film that has been protecting the hooks from fouling. Further, there is no reduction in the fastening integrity of the hooks in the main central region 408, due to any unfused film residues.

As shown in FIGS. 5 and 6, the valley 642 is a 2-walled valley, being bounded on one side by a wall 641 that forms part of the land 640 and on the other side, by a wall 643 that forms part of the surface that extends to the main walls of the mold 632. It is also possible that the valley 642 be bounded by a wall only on the side toward the central main valley 638. In such a configuration, the valley constitutes a very wide valley, with the main wall 645 of the mold 632 constituting the other bounding wall of the valley. This consideration applies all around the central valley region.

Figure 8:
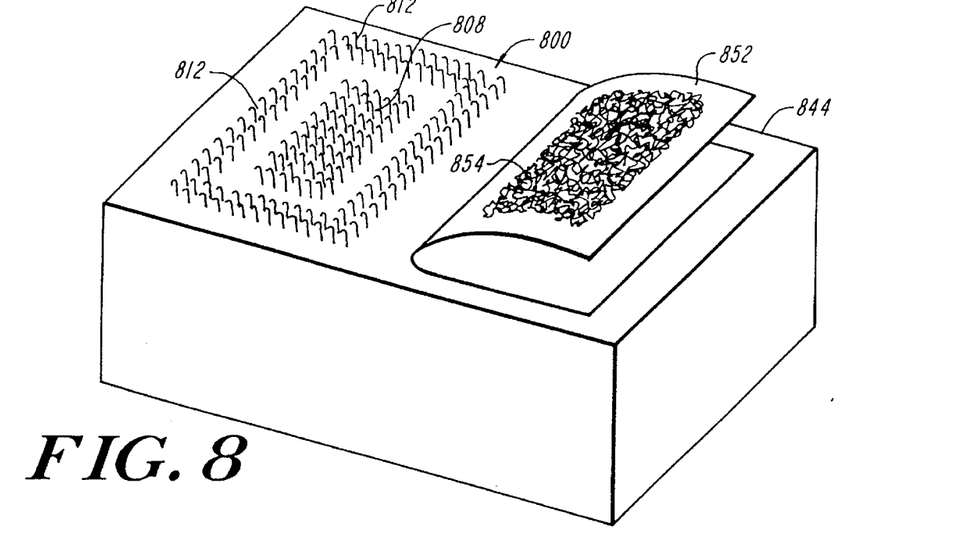
FIG. 8 is a schematic perspective representation of a separable fastener component of the invention, molded into a foam body, capable of being separably fastened to a fabric covering with a cooperating fastener component attached thereto, shown separated.

A molded object 844 of the invention, incorporating a separable fastener component 800 of the invention, is shown schematically in perspective view in FIG. 8. The molded object may be, for example, a seat cushion for an automobile, or an airplane. A cover 852 for the foam cushion 844 is shown schematically as a planar sheet, which is fixed to the cushion, for instance with two of the separable fasteners of the invention, one being shown, and designated 800, the other being hidden under the part of the sheet 852 shown in place.

The sheet 852 carries a mating companion fastener component 854, designed to mate with and separably fasten to the hooks or hook-like elements of the embedded separable fastener 800 of the invention. Such material may include, but is not limited to knitted, woven, and non-woven fabric, napped and un-napped surface or loop-like fibers. These surface elements are referred to below as the "loop-like"

elements, or "loops", whether or not they actually are in the form of loops. The sheet 852 is secured to the foam product 844 by engaging the loops 854 with the hooks of the main central region 808 of the embedded separable fastener component 800. The extent of the looped region 854 on the sheet 852 is designed to overlap with the main central portion 808 of the embedded separable fastener component 800. The degree of overlap will depend on the relative degree of adhesion required, and the adhesiveness of the particular fastener system being used. The loops may even overlap and mate with the perimeter rib portion 812 of the embedded fastener 800, which will provide some limited fastening capacity in many circumstances.

To insure that the separable fastener 400 (FIG. 6) is securely embedded in the foamed product, anchors 648 may be provided on the non-fastening side of the base 406, opposite to the fastening side. Anchors are less necessary with the present invention than with the prior art, since the hooks in the perimeter rib, which are engaged by the foam to some extent, partially serve this function.

The anchors are trapped in the foam, and resist forces tending to pull the fastener component 400 away from the foam body 644. (Such forces arise when a cover or other article that is attached to the foam body 644 using the fastener of the invention, is separated.) The anchors may be of any suitable shape, such as mushroom, anchor, hook, low loops, etc. The anchors may be spread uniformly over the entire back surface 405 of the base 406, or may be provided in selected locations only.

It is important to hold the fastener component 400 tightly to the face of the mold 632 during the time that the foam material is being added, to minimize the chance that the foam material will seep between the fastener component 400 and the mold face, thereby fouling the hooks. One way to accomplish this, as is known, is to introduce a plate or shim 650 of magnetic material on the opposite side of the hook component 400 from the mold 632. The mold being magnetically attractable metal, the fastener component 400 will be forced toward the face of the mold 632. The magnetic material may be coextensive with the fastener component 400, or may be provided in selected locations, such as around the perimeter, or adjacent raised lands 640.

Alternatively, a magnet may be incorporated into the mold, and magnetically attractive material may be associated with the fastener component. For instance, magnetically attractive powder may be incorporated into the fastener component to press it toward the mold. It is also possible to include a magnetic attractant in the material from which the hooks are formed, as described in copending, co-assigned U.S. patent application Ser. No. 08/390,876, entitled "Touch Fastener With Magnetic Attractant," in the names of Randall B. Kenney, Brian J. Routhier and Martin I. Jacobs, filed on even date herewith, which is incorporated herein fully by reference. This magnetic attractant application discusses many ways to associate magnetic attractant with a fastener component, such as incorporating magnetic attractant in the hooks themselves, in the base to which they are attached, or in a substrate attached to a hook and base assembly. The magnetic attractant can also be incorporated into the mating loop component, if it is that component that is to be molded into another body.

The pattern of hooks and hook-free bald regions may be introduced to the fastener component in any suitable fashion. A preferred method is that a product of the full width of hooks desired be provided according to known methods, such as molding, as shown in FIG. 4A. Such methods also include: extrusion, textile hooks, and printing by rotogravure or rotary screen.

In a preferred method, a roll of unspecified length, or of pieces cut to length, of separable fastener is provided. The roll or piece may be of any width, and one surface thereof is substantially covered with hook elements. The degree of cover depends on the type of separable fastener. If the width of the roll is greater than desired, the entire width is cut to the desired width. Then, the pattern of bald regions is applied. The general principals of applying the pattern to a roll also pertain to a cut piece. A roll is discussed below.

In a preferred embodiment, the pattern consists of elongated, parallel bald regions along the margins of the roll, adjacent parallel rib regions that carry hooks, between the bald region and the edges of the fastener component. There are also transverse bald regions that extend from one long bald region to the other, roughly perpendicular to each long bald region. These shorter, transverse bald regions are formed near the end of the article. The very ends of the article also constitute perimeter ribs of hooks.

According to one preferred method, the pattern is applied with an ultrasonic rolling tool 1160, which rolls along the hook carrying surface 1104 of the separable fastener component. The rolling tool 1160 has raised areas 1162 and depressed areas 1164. When it rolls along the hook surface, the raised areas 1162 essentially crush the hooks, with the aid of an ultrasonic pulse and fuse them into the base portion of the separable fastener, leaving the pattern as described, shown in FIG. 11A, in dashed line outline. The rolling tool generates the same pattern for many cycles along the length of the hook carrying surface. After the desired number of patterns are imposed, individual lengths are cut from the roll.

Figure 11A:
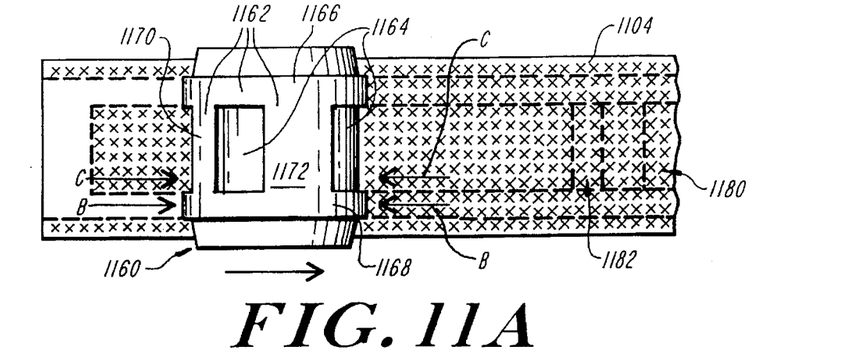
FIG. 11A is a plan view of a separable fastener component being treated by a rolling tool for imparting the pattern of bald regions.
Figure 11B:
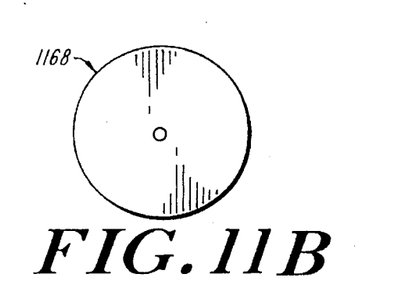
FIG. 11B is a cross-sectional view along lines B—B, of the rolling tool only.
Figure 11C:
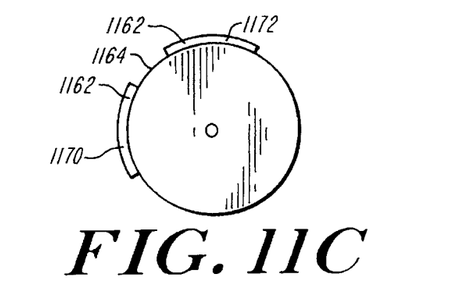
FIG. 11C is a cross-sectional view along lines C—C of the rolling tool only.
Figure 11D:
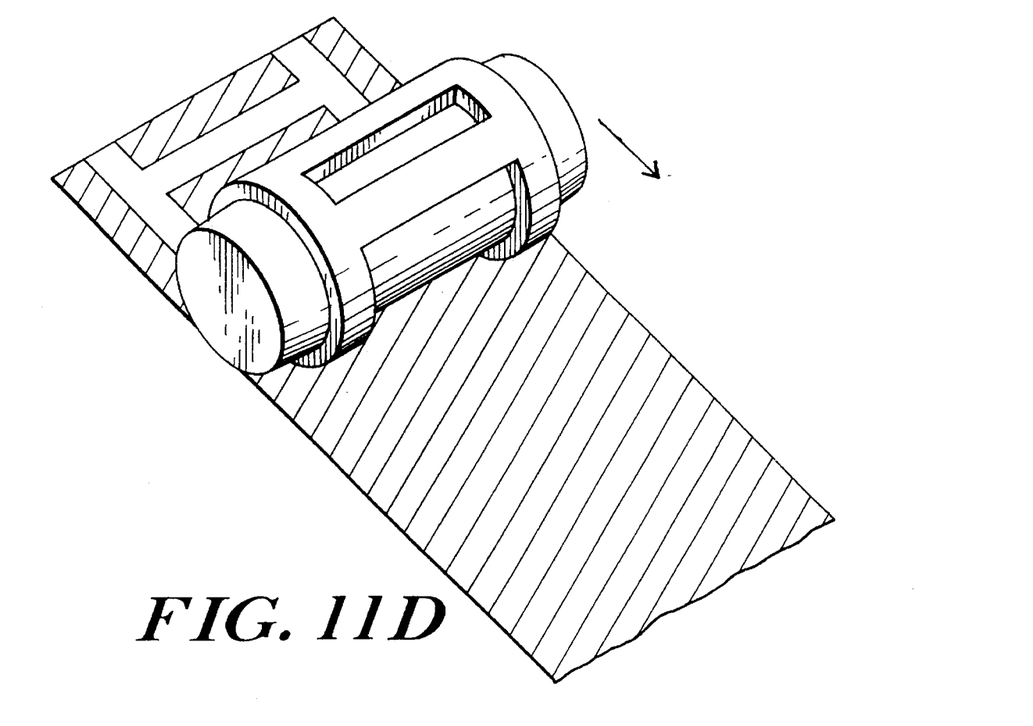
FIG. 11D is a perspective view of the tool shown in FIG. 9A, being applied to a separable fastener component.

The rolling tool preferable has a pair of spaced apart marginal raised rings 1166 and 1168, which generate the elongated bald portions of the pattern.

The rolling tool also has two, relatively closely spaced transverse raised regions 1170 and 1172. One of the transverse raised regions removes the hooks from a first region 1182, and the other transverse raised region removes the hooks from a second region 1180. A hook carrying region remains between the two bald regions 1180 and 1182. Each individual pattern terminates in the middle of the hook carrying region between the two bald regions 1180 and 1182. This is where the cuts would take place to separate individual lengths from adjacent lengths.

According to this method, a wide range of sizes of separable fastener components can be made with a few interchangeable parts. Stock width of material, carrying hooks (or other fastener elements) over its entire surface may be provided, and cut to the desired width. Then, the widths may be treated with a roller of a specific size, with different spacing between the rings 1166 and 1168 to change the width of the main region. Similarly, a roller having a different spacing between the transverse raised regions 1172 and 1170 can be provided to change the relative length of the main body portion and the end portions of sacrificial fastener components. Changing the thickness of the rings 1166 changes the width of the bald moats to be formed in the fastener surface. Changing the diameter of the roller changes the overall length of one fastener component. Thus, great flexibility is provided with a number of relatively simple parts.

For more complex, less regular parts, specific ultrasonic welding horns can be provided of a suitable shape to create the bald pattern desired, such as the bald region 420 in FIG.

4C. Such ultrasonic tools can be applied repeatedly along a length or sheet of virgin fastener component material, like a common cookie cutter.

Rather than using an ultrasonic welding technique, other suitable techniques for generating the pattern can be applied. These would include incorporating the bald pattern in the original woven pattern. Another technique suitable for some situations is to "skive" or shave hooks away, using a blade. This is particularly useful for removing the hooks along the long sides of the fastener component. Skiving may also be used in combination with another method.

Figure 9:
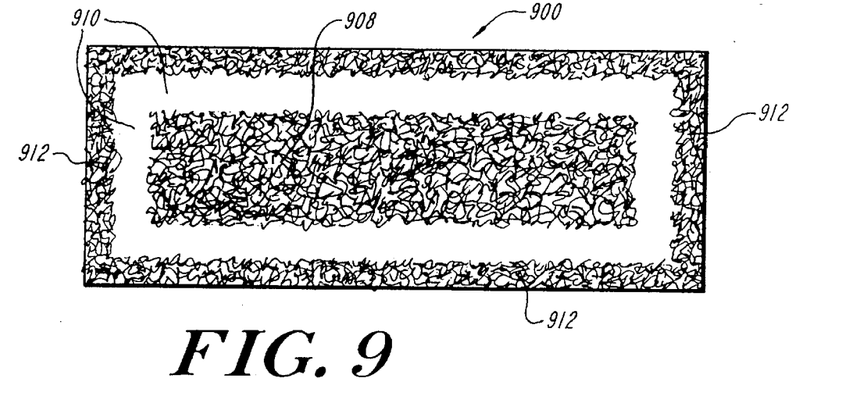
FIG. 9 is a schematic plan representation of another embodiment of the invention, having a generally rectangular bald perimeter section surrounded by a perimeter section of loop-type fastener elements with the main fastener section also being composed of loop-type fastener elements.

In the foregoing discussion, it has been generally assumed that the component of the fastener system that is being embedded into the foam article is the hook carrying component. However, this is not required. As shown in FIG. 9, the invention works satisfactorily using a loop carrying component 900 to be embedded into the foam product, rather than a hook carrying component. In that case, there is a main, looped region 908, surrounded by a bald moat 910, surrounded in turn by a perimeter rib 912 covered with loops. The choice of using hooks or loops for the embedded product depends on many factors, including the foam type, the use for the foamed product and its shape, as well as the use of and shape of the material that must carry the mating component, i.e., the non-embedded component. Also of consideration is the assembly process of the finished parts. For instance with the seat cover use, typically the fabric covers that are waiting to be installed are stacked one on top of another, with the fastener component adjacent to the next fabric cover. The loop-type component is used for the fabric covers, because hook-type components would snag the adjacent fabric.

The shape of the fastener component need not be rectangular, of course, and may be any arbitrary shape, as shown schematically in FIG. 4C, showing a main hooked region 418, surrounded by a bald moat region 420, which is itself surrounded by a perimeter rib region 422, all of a relatively arbitrary shape. (The dotted regions "S" are regions where hooks are optional and for purposes of the present discussion, are not present.)

Figure 10:
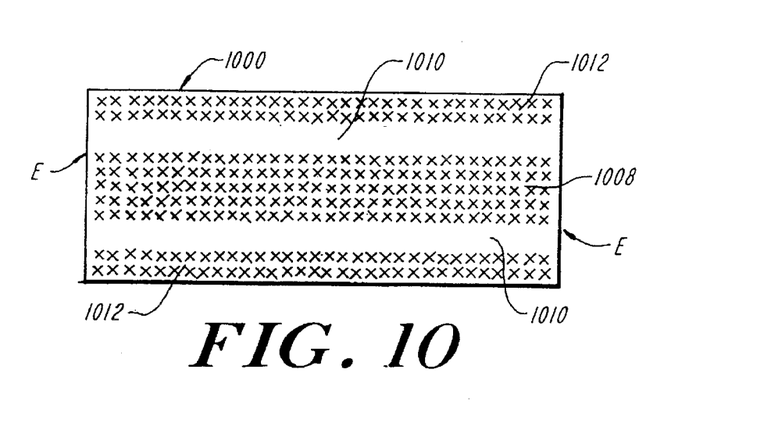
FIG. 10 is a schematic plan representation of another embodiment of a separable fastener component of the invention, having linear bald sections only along two edges of the fastener component.

In some cases, it may not be necessary to have the moat and perimeter rib completely surround the main central region. For instance, as shown in FIG. 10, a central region 1008 is bounded on two sides by essentially linear moats 1010, which are bound on their sides away from the center by linear ribs 1012. This configuration can be used where other considerations tend to prevent the molding material from intruding from the ends E. Such considerations include a mold shape that itself blocks the intrusion, such as where a strip 1000 extends the full length of a mold, between two major mold walls.

It may also not be necessary to use a fully surrounding moat and perimeter rib, if the foam is not particularly intrusive. Thus, all that is necessary is that the bald moat substantially circumscribe the main central region, and that the bald moat region, in turn, be substantially circumscribed by a perimeter region of sacrificial hooks. For instance, the regions "S" shown in dotted outline in FIG. C could be provided with some degree of hooks without destroying the functionality of the cooperating bald moat 420 and perimeter rib 422.

Examples of useful molding materials for constituting the product into which the fastener is incorporated include polyurethane, polystyrene, polyvinyl chloride, polyolefin, polyester, polyamide, synthetic rubber, and the like. The molding material may be charged into the mold in a liquid, granular, or powdery form, whichever is suitable. Once cured, the molded article may be soft and foamy, such as a cushion. Alternatively, it may be hard and relatively inflexible, such as a polystyrene.

EXAMPLE

Samples trialed in a polyurethane foam mold were made of molded polyamide hooks with a laminate polyester knit loop backing. The pattern was of the type shown in FIG. 4A. Foam did not intrude into the center hook area. The bond to the foam was sufficient. Hooks would engage with the cover backing loop component The foregoing discussion should be understood as illustrative and should not be considered to be limiting in any sense. While this invention has been particularly shown and described with references to preferred embodiments thereof, it will be understood by those skilled in the art that various changes in form and details may be made therein without departing from the spirit and scope of the invention as defined by the claims.

Having described the invention, what is claimed is:

1. A separable fastener component for use with a complementary separable fastener component, said separable fastener component comprising:
   a. a base member, having a nominal fastening face and a non-fastening face; and
   b. carried on said fastening face, a pattern of fastening elements, said fastening elements selected from the group consisting of hook-type and loop-type elements, said pattern comprising:
      i. a main region carrying fastening elements;
      ii. substantially surrounding said main region, a bald region that is substantially free of fastening elements; and
      iii. substantially surrounding said bald region, a perimeter region that carries fastening elements.

2. The separable fastener component of claim 1, said bald region comprising a rectangular annulus.

3. The separable fastener component of claim 1, said perimeter region that carries fastening elements comprising a rectangular annulus.

4. The separable fastener component of claim 1, further comprising, carried on said non-fastening face, anchoring elements.

5. The separable fastener component of claim 1, said fastening elements in said perimeter region comprising hook-like elements.

6. The separable fastener component of claim 1, said fastening elements in said perimeter region comprising loop-like elements.

7. A separable fastener component for use with a complementary separable fastener component, said separable fastener component comprising:
   a. a base member, having a nominal fastening face and a non-fastening face; and
   b. carried on said fastening face, a pattern of fastening elements, said fastening elements selected from the group consisting of hook-type and loop-type elements, said pattern comprising:
      i. a main region carrying fastening elements;
      ii. spaced apart, bounding a portion of said main region, a pair of bald regions that are substantially free of fastening elements; and
      iii. adjoining each of said bald regions, a bounding region that carries hook-type fastening elements, arranged such that each bald region is sandwiched between said main region and a respective bounding region.

8. The fastener component of claim 7, said main region comprising a rectangle.

9. The fastener of claim 8, said pair of bald regions comprising rectangles.

10. A separable fastener apparatus comprising:
   a. a first separable fastener component comprising:
      i. a base member, having a nominal fastening face and a non-fastening face; and
      ii. carried on said fastening face, a pattern of first fastening elements, said fastening elements selected from the group consisting of hook-type and loop-type elements, said pattern comprising:
         A. a main region carrying said first fastening elements;
         B. substantially surrounding said main region, a bald region that is substantially free of said first fastening elements; and
         C. substantially surrounding said bald region, a perimeter region that carries said first fastening elements; and
   b. a second separable fastener component comprising a surface carrying fastening elements that are complementary to said first fastening elements.

11. The separable fastener of claim 10, said first fastener elements in said perimeter region comprising hook-type elements.

12. The separable fastener of claim 10, said first fastener elements in said perimeter region comprising loop-type elements.

13. The separable fastener of claim 10, said bald region comprising a rectangular annulus.

14. The separable fastener of claim 10, said bald region comprising a non-rectangular annulus.

* * * * *